United States Patent [19]

Mensah et al.

[11] Patent Number: 4,636,405
[45] Date of Patent: Jan. 13, 1987

[54] CURING APPARATUS FOR COATED FIBER

[75] Inventors: Thomas O. Mensah, Big Flats; Dale R. Powers, Painted Post, both of N.Y.

[73] Assignee: Corning Glass Works, Corning, N.Y.

[21] Appl. No.: 813,575

[22] Filed: Dec. 24, 1985

[51] Int. Cl.⁴ .............................................. B05D 3/06
[52] U.S. Cl. .................................... 427/54.1; 118/641
[58] Field of Search ............... 427/54.1; 118/641, 642, 118/643

[56] References Cited

U.S. PATENT DOCUMENTS

| | | | |
|---|---|---|---|
| 2,266,392 | 12/1941 | Durant et al. | 118/643 |
| 3,576,125 | 7/1971 | Seigel | 350/312 |
| 4,076,510 | 2/1978 | Mracek et al. | 427/54.1 |
| 4,099,839 | 7/1978 | Vazirani | 427/54.1 |
| 4,100,418 | 7/1978 | Brown | 250/373 |
| 4,101,424 | 7/1978 | Schooley et al. | 250/504 |
| 4,107,391 | 8/1978 | Moore et al. | 427/53.1 |
| 4,125,644 | 11/1978 | Ketley et al. | 427/54.1 |
| 4,324,575 | 4/1982 | Levy | 427/54.1 |

Primary Examiner—John H. Newsome
Attorney, Agent, or Firm—W. J. Simmons, Jr.

[57] ABSTRACT

An apparatus is provided for curing a coating applied to an optical fiber. An elongated ultraviolet lamp and the optical fiber emerging from the coater are located at focii of an elliptical mirror which focuses the ultraviolet energy onto the coated fiber. The fiber is surrounded by a cylindrical chamber that is transparent to ultraviolet light. The chamber includes a jacket through which there flows a fluid which absorbs infrared energy. A cooling gas flows from a annular slot located at the bottom end of the chamber. The slot is so angled that gas flowing therefrom is directed upwardly and inwardly toward the coated fiber so that there exists within the chamber a recirculating flow of cooling gas. This enables the cooling gas to repeatedly absorb heat from the coated fiber and give up that heat to the chamber wall which is cooled by the fluid.

9 Claims, 3 Drawing Figures

CURING APPARATUS FOR COATED FIBER

BACKGROUND OF THE INVENTION

This invention relates to a method and apparatus for curing a coating applied to an elongated filament. More particularly, it relates to a method and apparatus for maintaining a coated optical fiber at a relatively low temperature during the curing operation.

Glass optical waveguide fibers must exhibit high strength in order to withstand the stresses which are encountered while incorporating them into protective sheathing or cable, while installing the cable, or during use. While such fibers are typically quite strong as drawn, this strength is rapidly degraded by surface defects which are introduced into the fiber through handling or otherwise. To preserve the strength of a newly drawn fiber, it is conventional to apply a protective coating to the fiber immediately after it is drawn.

The coated fiber usually passes through an ultraviolet curing oven which employs a lamp that generates infrared radiation in addition to the ultraviolet energy needed for curing. If an excessive amount of infrared radiation reaches the coating, it can cause evaporation of the surface of the coating material. In a two-stage coating apparatus, the primary coating is usually subjected to ultraviolet energy for curing prior to the application of the secondary coating. If the primary coating is not maintained at a sufficiently low temperature when the fiber enters the second coater, the viscosity of the primary coating will be so low that variations in diameter of the first applied coating can result. Some defects caused by an excessively high coating temperature can be detected by observing a section of coated fiber under a microscope where the surface of the primary coating can be seen through the secondary coating. The primary coating should appear as two parallel lines, indicating uniform diameter. If the primary coating is too hot when the coated fiber passes into the secondary coater, the primary coating surface may appear as two undulatory lines. Also, the temperature of the coated fiber can be measured by a non-contact fiber temperature measuring device. The maximum permissible temperature for conventional UV curable coating materials is about 80° C.

When drawing fiber at a relatively low rate, we cooled the coating material in the curing oven by passing the coated fiber through a transparent cylinder through which inert gas was flowed. For example, a draw rate of about 5 m/sec required the flow of about 12 1/min of nitrogen to cool the coating. When the draw rate was increased to 10 m/sec, the power of the ultraviolet light source had to be increased in order to adequately cure the coating, and the nitrogen flow rate had to be correspondingly increased. An inordinately high rate of coolant gas flow is expensive and can cause excessive vibration of the fiber whereby it is deflected from its intended position in the cavity where the ultraviolet light is most highly focused. Also, fiber vibration can affect coating concentricity in the preceding coating apparatus.

SUMMARY OF THE INVENTION

It is therefore an object of the present invention to provide an apparatus for cooling an optical fiber coating while it is in the ultraviolet curing oven. Another object is to cool the coating without excessively vibrating the fiber.

Briefly, the curing apparatus of the present invention comprises an elongated lamp mounted parallel to the axis along which the coated fiber passes. Focusing means is provided for directing ultraviolet energy generated by the lamp onto the axis. Surrounding the axis is a double-walled jacket having inner and outer cylinders that are transparent to ultraviolet energy. Means is provided for flowing through the jacket a fluid which absorbs infrared energy. The apparatus may further comprise means for flowing a cooling gas through the inner cylinder so that it flows over the coated fiber. The cooling gas preferably has a flow component which is directed radially inwardly toward the fiber and a flow component which is directed toward the opposite end of the inner cylinder where gas venting means is optionally located. That end of the inner cylinder adjacent the cooling gas source can be provided with means such as an adjustable iris diaphragm for restricting the flow of ambient air into that end of the inner cylinder from which the fiber emerges.

The invention also relates to a method for coating a fiber and thereafter curing the coated fiber, wherein the curing step is characterized as follows. The coated fiber is passed through an elongated jacket formed of inner and outer cylinders that are transparent to ultraviolet light. There is flowed between the cylinders a fluid that is transparent to ultraviolet energy but absorbs infrared energy incident thereon. Ultraviolet and infrared energy are radiated toward the jacket, whereby infrared energy is filtered but ultraviolet energy is transmitted to the coated fiber.

It is that band of ultraviolet energy beteen about 200 nm and about 400 nm that is useful for curing presently known plastic coatings for optical fibers. The term "ultraviolet energy" as used herein means any wavelength band in the ultraviolet portion of the electromagnetic spectrum that is useful for curing the applied plastic coating.

As used herein the phrase "transparent to ultraviolet energy" means that a major portion of the incident ultraviolet energy is transmitted.

As used herein the phrase "infrared filter" or the like means an optical device which removes or filters a major portion of the infrared energy incident thereon.

DETAILED DESCRIPTION OF THE INVENTION

It is to be noted that the drawings are illustrative and symbolic of the present invention, and there is no intention to indicate scale or relative proportions of the elements shown therein.

Figure 1:
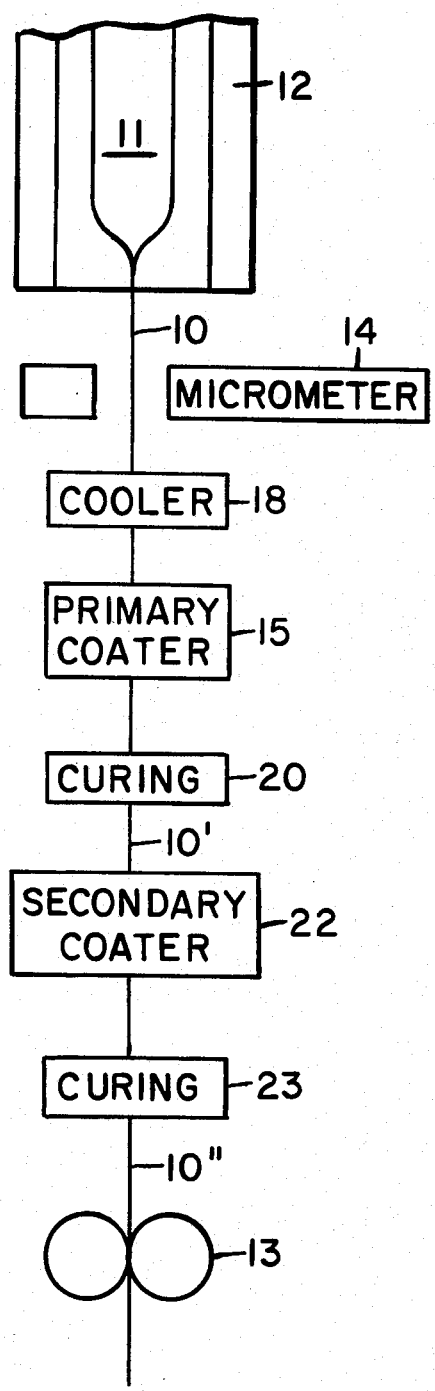
FIG. 1 is a schematic illustration of an apparatus for drawing and coating optical fibers.

Referring to FIG. 1 there is shown an apparatus for drawing an optical waveguide fiber 10. In the illustrated embodiment, the fiber is pulled by tractors 13 from a preform 11, the tip of which is softened in furnace 12. Other fiber forming techniques such as drawing from a melt can also be employed. Fiber 10 may consist of a glass core surrounded by a layer of cladding glass of lower refractive index than the core. Alternatively, fiber 10 may consist solely of core glass, the plastic material applied thereto in coater 15 comprising the cladding.

Means 14 may be provided between the coater and the furnace for measuring the fiber diameter and determining the position of the fiber. Also, means 18 may be provided for cooling the fiber before it enters primary coater 15. The coated fiber is subjected to ultraviolet light in curing oven 20 to cure the coating. A further layer of coating material may be applied to coated fiber 10' by a secondary coater 22. The secondary coating is subjected to ultraviolet light in curing oven 23, and the resultant coated fiber 10" is engaged by tractors 13. Curing ovens 20 and 23 may each consist of a single oven or a plurality of ovens arranged in series.

Figure 2:
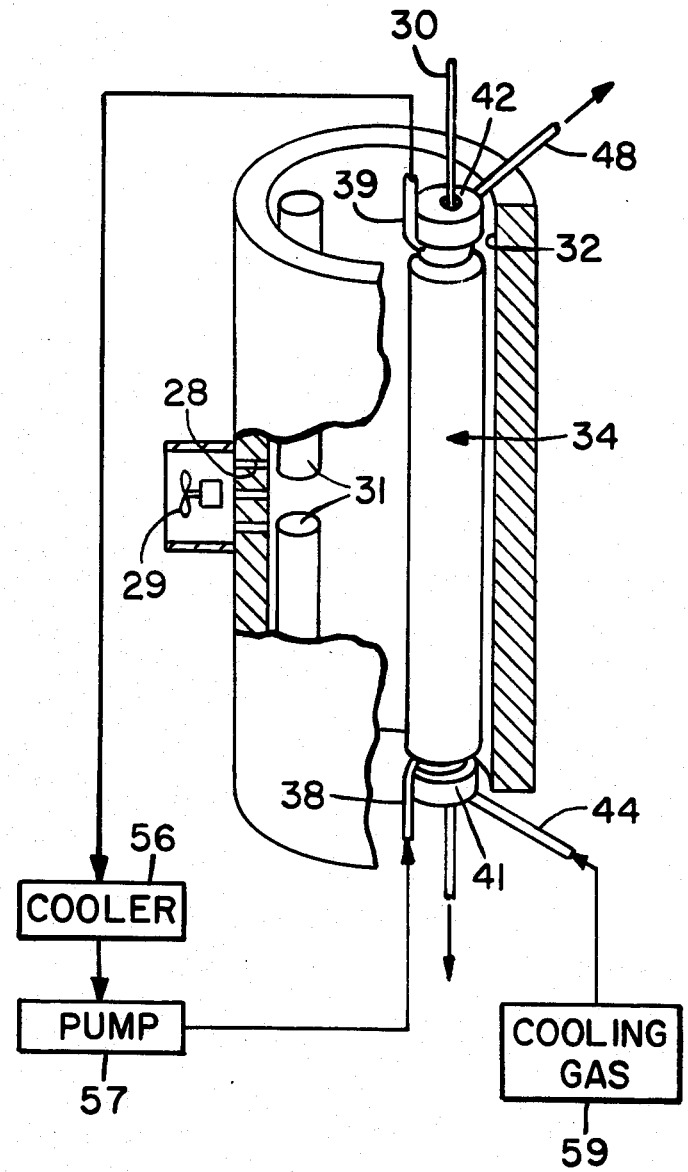
FIG. 2 is an oblique view, in partial section, of the coating cooling apparatus of the present invention.
Figure 3:
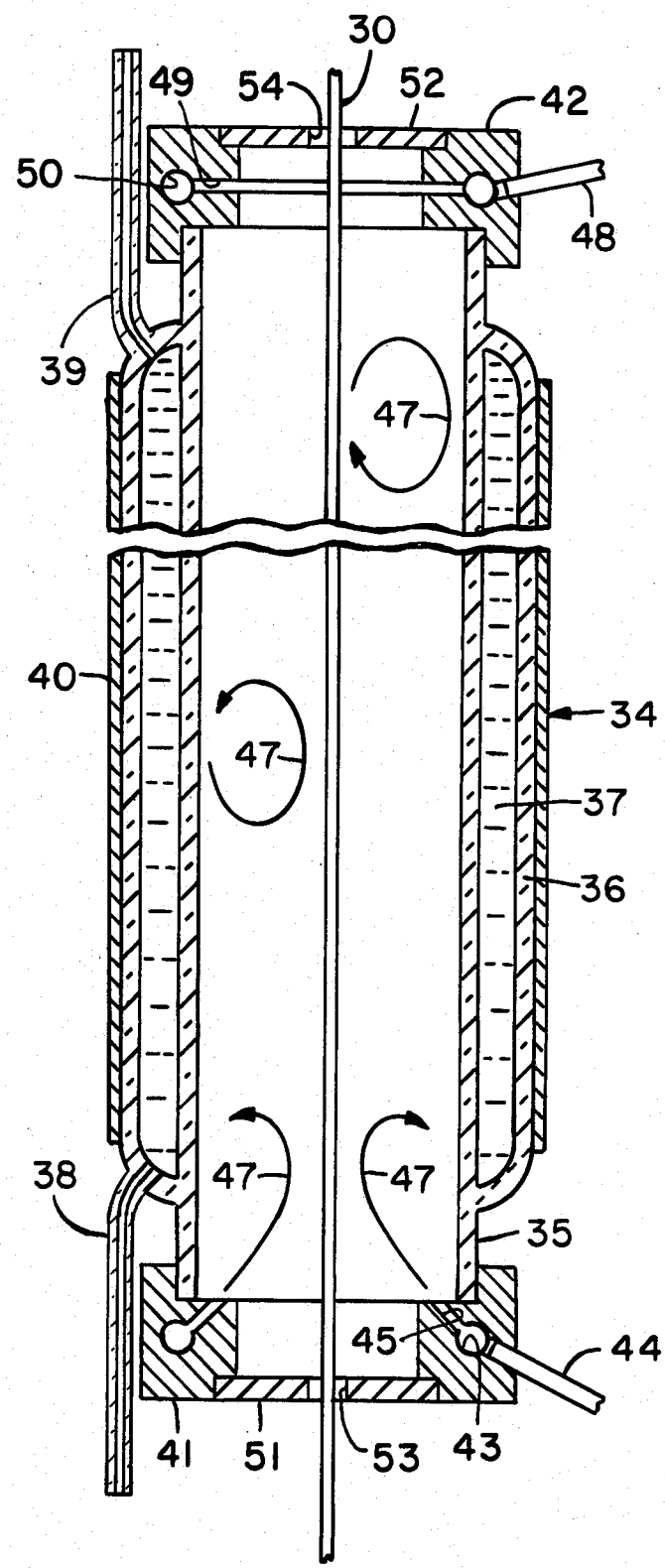
FIG. 3 is an enlarged cross-sectional view of the jacket of FIG. 2.

One or both of the curing ovens 20 and 23 can be constructed in the manner illustrated in FIGS. 2 and 3. Polymer coated glass fiber 30 is irradiated by one or more ultraviolet lamps 31, two such lamps being illustrated. The fiber and lamps are located at the two focii of an elliptical mirror 32 to ensure that a large amount of the light emitted by lamps 31 impinge on the coated fiber. When two or more lamps are employed they are connected to separate power sources (not shown) so that one or more of them can be energized as needed. Also, variable power sources can be employed. It is conventional to employ a fan 29 to blow air through vent holes 28 to cool the lamps.

The ultraviolet curing of optical fiber coatings is most effectively accomplished in the wavelength range of 200–400 nm. However, most ultraviolet sources emit a much wider spectrum with energies outside of this range. That portion of the radiation that is unnecessary for curing can lead to the excessive generation of heat both in the curing cavity and in the coating.

In accordance with the present invention a double-walled jacket 34 comprising concentric glass cylinders 35 and 36 surrounds the coated fiber. A fluid 37, which absorbs infrared energy, is passed through jacket 34 from inlet port 38 to outlet port 39. Glass cylinders 35 and 36 should be formed of a material such as fused silica, borosilicate glass or the like which is highly transmissive to ultraviolet light. An infrared absorbing glass such as 81 wt. % $SiO_2$, 13 wt. % $B_2O_3$, 2 wt. % $Al_2O_3$ and 4 wt % $Na_2O$ may be employed. Fluid 37 may consist of water or another suitable infrared absorbing fluid which transmits the desirable ultraviolet wavelengths. Fluid 37 can contain an infrared absorbing material such as $CuSO_4$, $CoCl_2$ or the like. Also, an infrared-absorbing material such as gold can be applied to jacket 34 in a thin layer 40 having a thickness of about 500 $\mu$m, for example.

Even though coated fiber 30 is shielded from some of the heating effects of lamp 31, some of the infrared energy therefrom reaches the fiber. Also, the temperature of the coating material increases when the curing reaction is exothermic. It is therefore advantageous to flow a cooling gas through cylinder 35. An inert cooling gas is usually preferred since a reactive gas such as oxygen can adversely affect the curing process by competing with the photoinitiators in the coating. As shown in FIG. 3, cylinder 35 is provided with end caps 41 and 42 for introducing and exhausting the cooling gas. The gas is fed to an annular chamber 43 by pipe 44. Annular slot 45 is conically shaped, whereby it directs the gas such that it has a component directed inwardly toward fiber 30 and a component directed toward endcap 42.

The resultant recirculating flow is represented by arrows 47. Heat picked up by the gas in cylinder 35 is removed through the walls of that cylinder. The resultant cooled gas thereafter again flows over the coated fiber and the abovementioned heat exchange cycle is repeated. When it reaches the top of cylinder 35, the gas can merely exhaust through aperture 54 through which the fiber enters cylinder 35. Means such as annular slot 49 in end cap 42 can also be used for exhausting the cooling gas. From slot 49 the cooling gas can flow through annular chamber 50 to exhaust pipe 48.

Endcaps 41 and 42 may be provided with iris diaphragms 51 and 52 having adjustable apertures 53 and 54, respectively. Apertures 53 and 54 can be opened relatively wide to initially feed the fiber through chamber 34. As the draw operation becomes stabilized, the apertures can be made smaller. It is especially important that aperture 53 be small during operation of the apparatus of FIGS. 2 and 3 to prevent ambient air from being drawn into cylinder 35 since oxygen in the air inhibits the free radical curing reactions.

The apparatus shown in FIG. 2 is especially useful when fluid 37 comprises an infrared absorbing additive. Fluid flowing from pipe 39 may be recirculated through cooler 56 and pump 57 back to inlet pipe 38. FIG. 2 shows that a coolant gas from source 59 can be flowed through chamber 34 and exhausted from pipe 48. Alternatively, the coolant gas could also be recirculated through a cooler and pumped back into pipe 44. Such a recirculation system would be especially useful if an expensive gas such as helium were employed.

The improvement obtained by employing a water cooling jacket in addition to a coolant gas is evident from the following example. An apparatus similar to that shown in FIGS. 1 through 3 was employed to draw and coat optical fibers. A 50 $\mu$m thick coating of UV curable acrylate was applied to a 125 $\mu$m diameter optical fiber in the primary coater. The coated fiber passed into a curing oven having a length of about 21 cm. The minor and major dimensions of the elliptical mirror were 9 cm and 11.8 cm, respectively, the distance between the two focii being 7.5 cm. Two 3000 watt lamps were located coaxially as shown in FIG. 2.

When drawing fiber at relatively low rates, we cooled the coating material in the curing oven by merely surrounding the coated fiber with cylindrical silica cylinder having an inside diameter of 2.5 cm and a wall thickness of 3.2 mm. At a draw speed of 5 m/sec one of the lamps was operated at full power, the other lamp remaining off. A flow of 12 1/min of nitrogen at about 25° C. was required to cool the coating a sufficient amount to prevent visual defects from occurring in the double-coated fiber as discussed above.

At a draw speed of 10 m/sec both lamps were operated at full power in order to provide a sufficient amount of ultraviolet energy to cure the coating. Because this also resulted in the transmission of more infrared energy to the fiber coating, the flow of nitrogen through the silica cylinder had to be increased to 60 1/min to adequately cool the coating.

Because of the aforementioned disadvantages resulting from such an excessively high flow rate of cooling gas, the silica cylinder was replaced by the double-walled silica jacket of FIGS. 2 and 3. The inside diameter of inner cylinder 35 was 2.54 cm and the outside diameter of outer cylinder 36 was 5.1 cm. The wall thickness of the cylinders was 3.2 mm. Water at a temperature of about 10° C. was flowed through the jacket at a rate of 3.4 1/min. An acceptable coating was obtained at a nitrogen flow rate of 30 1/min through cylinder 35.

We claim:

1. An apparatus for curing a coating applied to a fiber being drawn along a given axis, said apparatus comprising an elongated ultraviolet energy-generating lamp mounted parallel to said given axis, means for focusing said ultraviolet energy onto said given axis whereby a coating on a fiber drawn along said given axis becomes cured, a jacket surrounding said given axis, said jacket comprising inner and outer cylinders that are transparent to ultraviolet energy, and means for flowing through said jacket a fluid which absorbs infrared energy.

2. An apparatus in accordance with claim 1 wherein said fluid is water.

3. An apparatus in accordance with claim 1 further comprising means for flowing a cooling gas through said inner cylinder.

4. An apparatus in accordance with claim 3 wherein said means for flowing comprises means at one end of said inner cylinder for flowing said cooling gas such that it has a flow component which is directed radially inwardly toward said axis and a flow component which is directed toward the opposite end of said inner cylinder.

5. An apparatus in accordance with claim 4 further comprising means at that end of said inner cylinder opposite said one end for venting said gas.

6. An apparatus in accordance with claim 5 further comprising means at said one end of said inner cylinder for restricting the flow of ambient air into said inner cylinder.

7. In a method for coating a fiber and thereafter curing said coated fiber, said curing step being characterized in that it comprises passing said coated fiber through an elongated jacket formed of inner and outer cylinders that are transparent to ultraviolet light, flowing between said cylinders a fluid that is transparent to ultraviolet energy but absorbs a major portion of the infrared energy incident thereon radiating ultraviolet and infrared energy toward said jacket whereby a major portion of said infrared energy is filtered and a major portion of said ultraviolet energy is transmitted to said coated fiber.

8. A method in accordance with claim 7 further comprising the step of flowing a cooling gas through said inner cylinder.

9. A method in accordance with claim 8 wherein the step of flowing comprises flowing said cooling gas into one end of said inner cylinder in such a direction that it has a flow component which is directed radially inwardly toward said fiber and a flow component which is directed toward the opposite end of said inner cylinder.

* * * * *